April 7, 1953  V. A. BLOXHAM  2,634,117
APPARATUS FOR CONTINUOUS DRYING OF HOPS
Filed Jan. 28, 1950
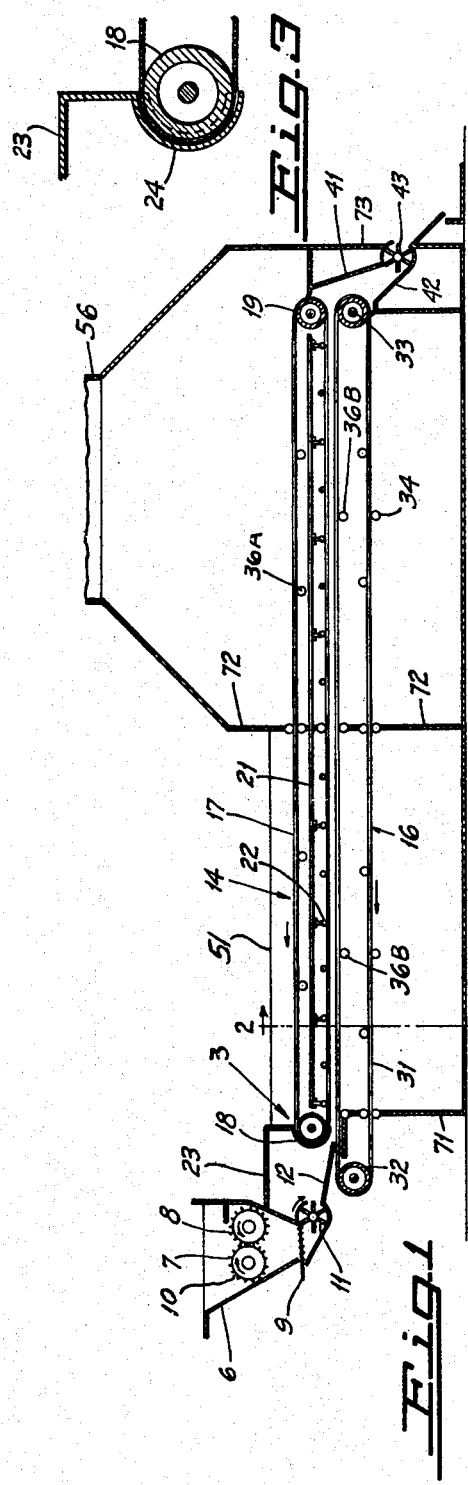
INVENTOR.
Verlin A. Bloxham
BY
ATTORNEY Patented Apr. 7, 1953

2,634,117

UNITED STATES PATENT OFFICE 2,634,117

APPARATUS FOR CONTINUOUS DRYING OF HOPS

Verlin A. Bloxham, Berkeley, Calif.

Application January 28, 1950, Serial No. 141,001

1 Claim. (Cl. 263—36)

This invention relates to an apparatus for the continuous drying of hops.

The usual apparatus employed in hop-drying involves the use of a house-like structure having a reticulated floor upon which the hops are loaded. Beneath the floor there is disposed a heater, commonly direct fired, and the products of combustion from which usually pass through a zig-zag or like arrangement of large pipes, located beneath the hop floor, on the way to the stack. Forced draft of air through the hops is not provided, the house being tall compared to its section so as to provide a stack effect, the hop-floor being some twenty feet above ground level. There are a great number of objections to this manner of drying, the major one probably being the variable quality of the dried product. This variable quality is due to several factors inherent in the process employed, one of the main ones of which is that the drying is more efficient in the lower portion of the bed, with the result that if the bed is not turned one or more times during the drying process, the drying will not be uniform and hops in one portion of the bed will be of a different moisture content from those in another portion.

The turning of the hops, to ensure uniformity in drying, has its own drawbacks. After the hops dry, they become very fragile and brittle and easily broken, and when the bed is turned to reverse the position of the upper and lower layers, many of the cones which have reached the brittle state will be broken, and the product taken from the dryer will have an excessively high proportion of fines. The labor involved in this operation is, of course, objectionable in addition.

As will be apparent from the above description of the apparatus, the hops are subjected not only to heat by convection from the pipes, but also to radiant heat. For this reason, though ordinary dry bulb thermometers are customarily used in order to control the temperature within the bed, the lower layers of hops to which heat is radiated will be at temperatures higher than that indicated by the thermometer. This consideration, of course, renders the control by thermometer inadequate and misleading and constitutes one of the reasons for lack of uniformity in the product, since the hop is extremely sensitive to excessive temperature. Further, action of this radiant heat is to raise the temperature of portions of the enclosure which are "seen" by the pipes to excessive levels. This results in the successive drying, charring and perhaps final combustion of the combustible material, generally wood, employed in construction of the driers; the loss of the driers by fire is a common occurrence.

A still further serious objection is encountered due to the fact that fines fall from hops through the floor and onto the hot pipes where they become charred and give rise to vapors which in turn pass through the hope and may be condensed on or absorbed by them.

The driers are tall, as referred to above, which increases the difficulty and labor involved in loading, turning and unloading. Floor loading is limited to about 24″. The heating system is inefficient, wasting as much as 50% of the heat.

The present invention contemplates the continuous drying of hops, thus avoiding any delay between the harvesting of the hops and the drying operation. This facilitates the harvesting operation inasmuch as it is not necessary to assemble a kiln charge prior to the drying operation for loading into the kiln. Thus, the drying operation and the harvesting operation can be coordinated and carried on simultaneously and continuously.

Of late, a practice has developed of pressing fresh hops and holding the hops under refrigeration until their use is desired, following which the hops are dried. The process and apparatus of the present invention are particularly suitable for the processing of these as well as hops taken directly from the field; in either case, the hops are green and undried.

It is an object of my invention to provide an apparatus for the continuous drying of hops.

A further object of the invention is to provide an apparatus resulting in a vastly superior product from the drying floor, due to uniformity of drying, adequacy of control and the avoidance of crushing the lower layers.

I have developed a novel and satisfactory apparatus for drying hops.

The embodiment of the invention will become further apparent upon consideration of the following, wherein the drawing shows a preferred apparatus set-up and wherein Figure 1 is a side elevation partly in section through a form of continuous hop-dryer embodying this invention.

Figure 2 is a section taken along the line 2—2 in Figure 1.

Figure 3 is a side elevation partly in section showing the seal utilized.

Figure 4 is a plan view showing the arrangement of the drying system.

To carry on a continuous drying of hops, I have found that the hops should be subject to drying under conditions suited to the moisture content of the hops. Thus, I preferably employ a plurality of drying zones, maintaining a first zone at a relatively high temperature and a second zone at a lower temperature. I have found that if one attempts to dry the hops under substantially uniform conditions, adequate reduction of the moisture content of the hops is not attained if the temperature during the process be sufficiently low as not to harm the hops at any time, while if the drying of the hops is attempted under relatively elevated temperature conditions, the length of time of drying being reduced, the hops are over-cured, the volatile oils, which largely determine the quality of the hop, being lost or burned.

Referring to the drawings, a feed hopper 6 is provided into which the hops to be dried are introduced. The hopper is shown as provided with drums 7 and 8 having teeth 10 thereon which operate to pick the hops apart, particularly when a block of frozen hops is placed in the hopper 6. A vibrating screen 9 is provided across a lower portion of the hopper while a vaned feed wheel 11 rotates in a clockwise direction to move hops onto shelf 12, from which the hops are transferred to between the conveyors generally indicated at 14 and 16.

Conveyor 14 includes a porous flexible metal belt 17 passing about suitable drums 18 and 19 at each end of the conveyor. A horizontally extending member 21 is provided between the upper and lower runs of the conveyor, this having a plurality of spaced rollers 22 mounted thereon across the belt and adjacent the underside thereof to support the lower side of the conveyor belt 17 and prevent it from moving upwardly, as will presently appear. Other rollers 36A are provided upon the upper side of the horizontal member 21 to support the upper run of the conveyor belt. Housing 23 is provided over the shelf 12 and feed wheel 11, the housing including an arcuate portion 24 fitting snugly about the belt as it passes about the drum 18, as appears in Figure 3. The lower conveyor 16 includes a porous flexible metal belt 31 extended about drums 32 and 33. A plurality of rollers 34 are provided on either side of the lower run of the belt to hold it in position while rollers 36B are provided to support the upper run of the belt. The porous metal belts are well-known in the conveyor art; the openings therein pass the air freely while retaining the hops.

Shelf 12 feeds the hops to between the conveyor belts which move to the right in Figure 1, that is, the lower run of belt 14 and the upper run of belt 16 move to the right in Figure 1 at the same rate to confine the hops between them and carry them toward the opposite end of the conveyor structure whereat the hops pass downwardly between confining walls 41 and 42 and through a vaned discharge wheel 43.

The conveyors 14 and 16 are preferably confined to receive warm, dry air and pass this over hops placed between them. Thus, as appears in Figures 1 and 4, the initial portion of the run of the conveyors 14 and 16 is confined between vertical side walls generally indicated at 51 and by end walls 71 and 72; these provide a first drying zone or drying chamber generally indicated at 52 and which opens directly into the atmosphere.

The remaining portion of the conveyors 14 and 16 is confined by side walls 51 and end walls 72 and 73 to provide a second drying zone or chamber generally indicated at 54' this chamber including a return duct 56 leading into a furnace or heat tunnel 57 wherein oil, natural gas or the like is burned with air by burner 60 which is spaced from the sides of heat tunnel 57 so that the products of combustion from the burner mix with fresh air to supply a stream of hot, dry gas when mixed with the return gas from the second drying chamber. Each conveyor belt runs closely adjacent to a longitudinal seal member 53 extending along the belt to prevent the air from passing between the belt and the housing instead of through the belts and the hops. Heated air products of combustion are mixed directly and discharged through outlets 58 into a blower 59 and thence into chamber 54 through duct 61, while another portion of the hot air is taken through duct 62 into blower 63 and thence through duct 64 into drying chamber 52.

The operation of the apparatus will become further apparent upon the following description of an operation, for example, upon the handling of frozen hops. These are solid and are at approximately 32° F. as they are taken from a refrigeration chamber. The blocks, usually about 16" square and having a density of about 25.5 pounds per cubic foot, are fed into the hopper 6 from which they are picked apart by rolls 7 and 8 and pass through vane feeder 11 to between the conveyors 14 and 16. The belts are spaced apart a distance of about 5" and the blocks of hops are fed into the hopper at a rate such that this bed depth is maintained.

In the first drying zone, the hops are subject to hot, dry air at a temperature which should not exceed 180° F. and which is preferably of the order of 160° F., the air having a relative humidity of between 10% and 17%. A lower temperature can be utilized, but in this case the length of run of the hops in contact with the air must be increased; the lower temperature limit, in any case, is about 120° F. In the second zone, the air is at a temperature of preferably about 140° F.; of the order of 20° F. less than that in the first zone, the temperature should not be less than 120° F., in any case.

The air is forced through the hops at the rate of from 200 to 500 ft. per minute. The hops become defrosted within about 30 seconds after entering between the conveyor belts. When operating upon field hops, the bed depth can be increased to 30", rolls 7 and 8 being omitted. From the above, it will be observed that the air is in contact with the hops for from 0.05 to 0.5 second, depending on the bed depth and the air velocity. In any case, the air velocity is such that the conveyor belts tend to move upwardly and it is for this reason that the rollers 22 are provided upon the underside of the upper run of conveyor belt 17 to hold the belt in place and prevent the hops from being displaced by the air velocity.

Drying is accomplished by blowing conditioned air through the bed of hops from beneath under certain carefully controlled conditions. One of the most important of these is the velocity of air flow, this being particularly important because it serves two separate and distinct purposes to have this velocity at a proper value. The first reason is to secure lifting of the weight of the bed of hops. This is important, particularly in the latter stages of the drying as the hops become more fragile, because the weight of the upper layers is taken in large degree from the lower layers, and the crushing of these lower layers is thus substantially avoided; the air velocity should be such that the bed is supported by the upward air thrust and the fragile hop petals are not crushed, broken or compressed by the gravitational force acting on the bed. Another advantage of moving the air through the bed at a relatively high velocity is that less harm is done the hops if the temperature is elevated; for example, I have found that air at 200° F. could be passed through green hops at 400' per minute without damage whereas at 90' per minute the hops were severely damaged, the hops in each instance having initially free moisture present in substantially the same amount; free moisture is considered to be all water which is not chemically combined and which can be removed under the recited conditions of drying. A sufficiently high velocity is further important because it assures that the air in the upper portion of the bed will still be able, due to its low relative humidity, to abstract water from the hops in the upper layers. It will be apparent that if the air at the given conditions has abstracted from the lower layer of hops all the moisture it can hold, in other words, is saturated, the upper layers will not be dried but might even have water deposited upon them. I have found that these velocities for both purposes should be between 200 and 500 ft. per minute. The lower velocity value is determined largely by the consideration of drying the upper layers, while the upper value is that at which economical operation can be obtained in the light of the power and heat required.

Typical operations on frozen hops, employing conveyor belts 30" wide, are set forth in the following table:

|  | Sample 1 | Sample 2 |
|---|---|---|
| Total drying time | 1 hour, 1 minute | 1 hour, 1 minute. |
| Maximum temperature | 152° F | 138° F |
| Minimum temperature | 100° F | 105° F. |
| Maximum velocity | 440 F. P. M | 545 F. P. M. |
| Minimum velocity | 167 F. P. M | 170 F. P. M. |
| Floor depth | 6" | 5". |
| Final moisture | 23.5% | 16.2%. |

While I have mentioned the preferred use of a plurality of zones, this is not an absolute essential, providing one is willing to compromise and accept a product which may not be of the very best quality. It is to be remembered that a hop is a very fragile and delicate natural product. The petals containing moisture are very thin and, under drying conditions, give up their moisture readily. Where free moisture is present, as in hops taken from refrigeration, the initial drying temperature can be relatively elevated without damage to the product, thus speeding up the overall drying rate. As drying progresses, the free moisture disappears and, if the product is not to be harmed, I have determined that the temperature should be lowered. Thus, if one utilizes a single drying zone and air at a relatively high temperature, one must be content with a product of inferior quality or else reduce the temperature, accept a lower through-put rate, but achieve a quality product.

In outlining an apparatus utilizing two zones, I have provided a practical compromise between a one-zone operation and a plural-zone operation—for example, utilizing, say, five zones, the drying of the hops would be improved for this would enable the zones to be maintained at temperature gradients of 200°, 175°, 150°, 125° and 100° F. However, because of the increased apparatus cost and operation cost, I have disclosed a preferred form of an apparatus as practically operated, utilizing but two zones. In any case, hops dried in the disclosed apparatus, that is, by utilizing the continuous drying method, are of a better quality than hops dried in the ordinary kiln or in the so-called stationary kiln utilized heretofore. By blowing the air upwardly through the hop bed, the hops are maintained in a loose, gas-penetrating bed whereby substantially uniform drying takes place throughout the bed and the hops issue from the operation with a substantially uniform moisture content, between 7% and 11%.

I claim:

An apparatus for drying hops comprising a first conveyor movable in one direction over a path, a second conveyor movable over a portion of said path in said direction but in a superimposed and cooperative position with respect to the first conveyor to provide a confined space between said conveyors, the conveyors movable in a substantially gas-tight raceway and providing a support for hops therebetween and permitting gas to pass freely through said conveyors, a horizontally disposed member extending between the upper and lower runs of the second conveyor and carrying a plurality of spaced rollers pressing against said lower run to prevent it from moving upwardly, a plurality of rollers on either side of the lower run of the first conveyor, a plurality of rollers to support the upper run of the first conveyor, a plurality of gas chambers, each surrounding a different portion of said conveyors, but with the chamber first receiving the hops being entirely open to the atmosphere, a gas heater including a fuel burner for burning the fuel with air to provide a hot gas exit stream, a blower for blowing said hot gas into each of said chambers through said conveyors at a velocity sufficient to maintain gas unsaturated with humidity passing therethrough, a system of air ducts for evacuating heated air from all but one of said plurality of gas chambers and for returning at least some of the evacuated air to said heater, means for introducing fresh air into said heater, means for feeding hops between said conveyors at one end of the path, said feeding means including a receiving hopper containing a pair of cooperating, teeth-equipped drums to pick the hops apart, a vibrating screen therebeneath and a vaned feed wheel, and means for removing hops at the other end of the path.

VERLIN A. BLOXHAM.

REFERENCES CITED

The following references are of record in the file of this patent:

UNITED STATES PATENTS

| Number | Name | Date |
|---|---|---|
| 271,184 | Altenbrand | Jan. 28, 1883 |
| 473,263 | Proctor | Apr. 19, 1892 |
| 1,749,451 | Strong | Mar. 4, 1930 |
| 1,841,533 | Hopkins et al. | Jan. 19, 1932 |
| 1,965,229 | Galson | July 3, 1934 |
| 2,057,681 | Harrington | Oct. 20, 1936 |
| 2,282,230 | MacAlpine | May 5, 1942 |
| 2,510,372 | Bloxham | June 6, 1950 |
| 2,559,107 | Bloxham | July 3, 1951 |

FOREIGN PATENTS

| Number | Country | Date |
|---|---|---|
| 499,374 | Great Britain | Jan. 19, 1939 |
| 226,409 | Switzerland | July 1, 1943 |